Figure 1:
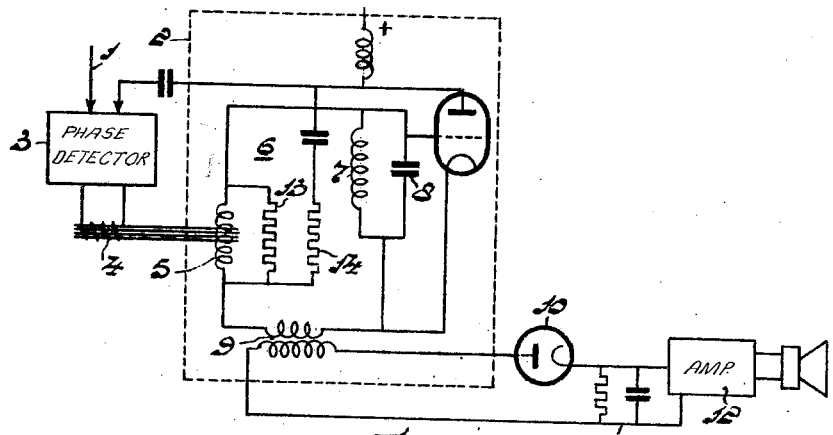

INVENTOR
GERARD HEPP
BY
AGENT

Dec. 23, 1952             G. HEPP             2,623,174
CIRCUIT-ARRANGEMENT FOR DETECTING FREQUENCY-MODULATED OSCILLATIONS
Filed Dec. 23, 1947             2 SHEETS—SHEET 2

INVENTOR
GERARD HEPP
BY
AGENT

Patented Dec. 23, 1952

2,623,174

UNITED STATES PATENT OFFICE 2,623,174

CIRCUIT-ARRANGEMENT FOR DETECTING FREQUENCY-MODULATED OSCILLATIONS

Gerard Hepp, Eindhoven, Netherlands, assignor to Hartford National Bank and Trust Company, Hartford, Conn., as trustee Application December 23, 1947, Serial No. 793,494
In the Netherlands November 2, 1946

Section 1, Public Law 690, August 8, 1946
Patent expires November 2, 1966

4 Claims. (Cl. 250—27)

The invention relates to circuit-arrangements for detecting frequency-modulated oscillations in which a resonant circuit having a variable impedance is incorporated in such manner that its instantaneous resonance frequency, owing to automatic variation of the said impedance, varies linearly with, and more particularly is substantially equal to the instantaneous frequency of the oscillations required to be detected.

In a known circuit-arrangement of this kind these oscillations are supplied, together with oscillations produced by a local oscillator, to a detector the output voltage of which acts in such manner upon the variable reactance of the frequency-determining resonant circuit of the local oscillator that the instantaneous value of the frequency produced by this oscillator is substantially equal to that of the input oscillations to be detected. The detected oscillations are derived from the output voltage of the detector. Such a circuit is shown in U. S. Patent 2,332,540.

A disadvantage of this circuit-arrangement is that this output voltage does not vary linearly with the frequency sweep of the oscillations to be detected, which is primarily due to the fact that the frequency of the oscillations produced by the local oscillator does not vary linearly with the output voltage of the said detector. Means to neutralize this non-linearity with the aid of elements exhibiting a compensating non-linearity, do not give satisfactory results in practice inter alia since the non-linearity is variable with time. Moreover, if for the variable impedance use is made of a variable inductance, the permeability of the iron core of which is varied with the aid of a magnetizing current, it is fundamentally impossible to obviate the non-linearity, since the permeability, owing to hysteresis phenomena, is a bivalent function of the magnetizing current.

In another known circuit-arrangement the oscillations required to be detected are supplied, on the one hand, through a series resonant circuit in phase-opposition to the two control-grid circuits of two push-pull connected tubes and, on the other hand, they are made operative in the common cathode circuit of these tubes. If the series resonant circuit is in resonance with the frequency of the oscillations to be detected, the two grids therefore have equal voltages. If the resonance frequency of the circuit differs from the instantaneous value of the frequency of the oscillations to be detected, the grid voltage of one tube will be increased by the voltage across the circuit whereas that of the other tube will be decreased by this voltage. The result thereof is that, if the resonant circuit is not in resonance with the frequency of the oscillations to be detected, a current will flow in the output circuits of the two tubes. This current acts upon a variable reactance included in the resonant circuit, in such manner that the resonance frequency of the circuit becomes substantially equal to the instantaneous value of the frequency of the oscillations to be detected. In the known circuit-arrangement the detected oscillations are derived from this current, so that again the same disadvantage occurs as with the first-mentioned circuit-arrangement.

The invention provides a simple circuit-arrangement with which there exists a highly satisfactory linearity between the signal to be detected and the detected signal.

According to the invention, the amplitude-modulated high-frequency oscillations produced in the circuit of the said variable impedance, is supplied to an amplitude detector from the output circuit of which the oscillations are taken.

In order that the invention may be more clearly understood and readily carried into effect, it will now be described more fully with reference to the accompanying drawing, which represents a few embodiments thereof shown by way of example.

Figure 2:
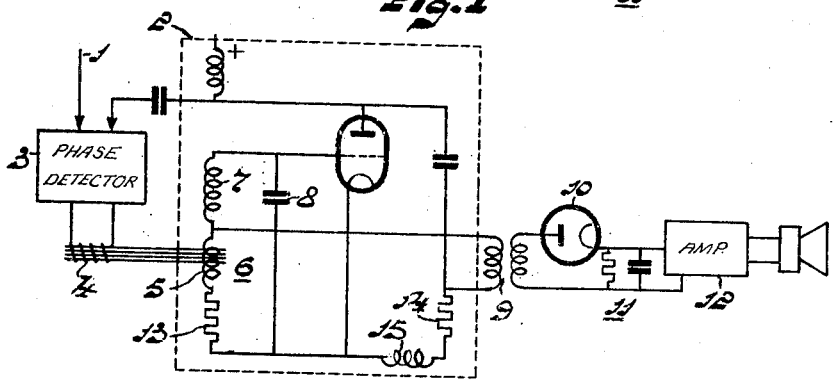
Figure 3:
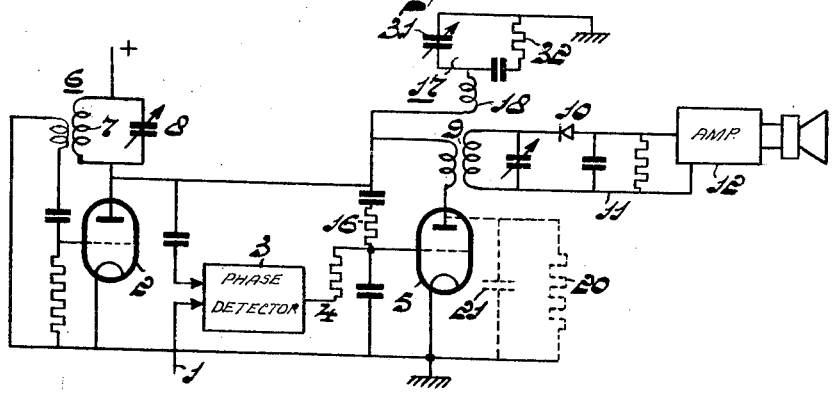
Figure 4:
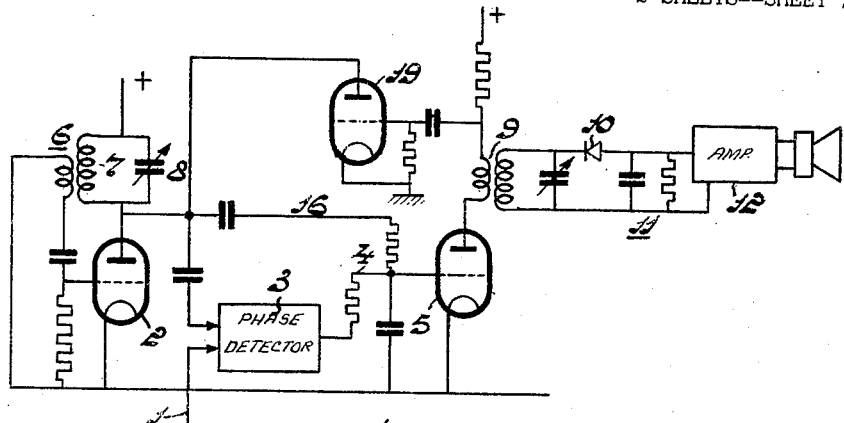
Figure 5:
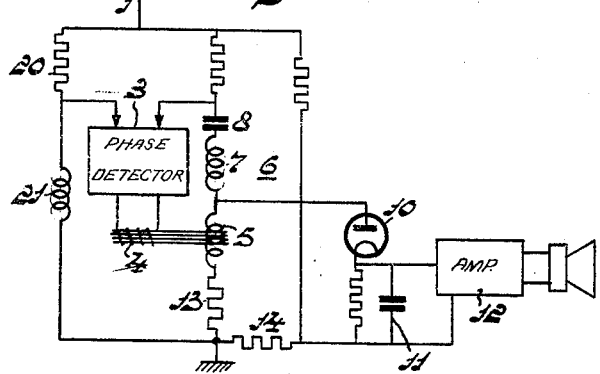
Figure 6:
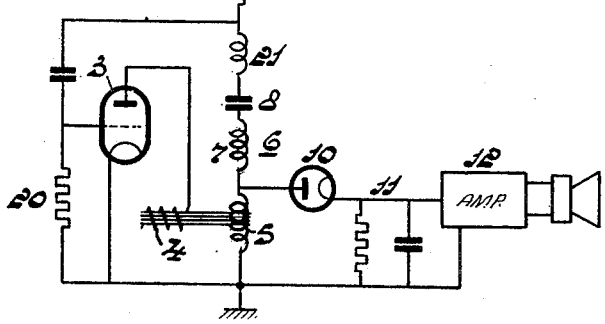

Figure 1 shows a schematic diagram of a circuit according to the invention. Figure 2 shows a further embodiment of the species shown in Fig. 1. Figs. 3 and 4 show schematic embodiments of the invention utilizing reactance tubes. Figs. 5 and 6 show further embodiment of the circuit of the invention shown in Fig. 1. According to Figs. 1 and 2 of the drawing, the frequency-modulated input voltage required to be detected is supplied, via a conductor 1, together with the output voltage of a local oscillator 2 which generates oscillations, the instantaneous frequency of which is substantially equal to that of the frequency-modulated signal, to a detector 3, the output voltage of which depends upon and, in first approximation, is proportional to the phase difference between the two voltages and which may, for example, be constructed in form of a diode-, triode-, mono-phase-, push-pull- or mixing detector. The output current taken from the detector 3 is led, if desired after amplification, through the magnetizing winding 4 of an inductance 5 which comprises a ferromagnetic core the permeability of which depends on the current passing through the magnetizing winding. This inductance 5 forms part of a frequency-determining resonant circuit 6 of the local oscillator 2, this selfinductance being connected, in the circuit-arrangement shown in Fig. 1, in parallel and in the circuit arrangement according to Fig. 2 in series with an inductance 7 and a capacity 8. Owing to this method of connecting, the relative variation of the current flowing through the variable inductance or of the voltage across this inductance is large with respect to the relative frequency sweep and large with respect to any amplitude variation of the oscillations produced by the oscillator 2.

In the same way as with the known circuit-arrangements this output voltage of the detector 3 controls the frequency of the local oscillator 2 in such manner that this frequency is substantially equal to that of the input oscillations, whilst the amplitude modulation of the input oscillations does not affect the amplitude of the oscillations produced by the local oscillator 2. Across the secondary winding of a transformer 9, which is connected, in the circuit-arrangement shown in Fig. 1, in series and in the circuit-arrangement according to Fig. 2, in parallel with the variable inductance 5 and which has a small or a high impedance respectively with respect to this inductance, a voltage is set up which, as will be explained hereinafter, exhibits an amplitude modulation which varies practically exactly linearly with the frequency sweep and which, as has been said before, is independent of any amplitude modulation of the signal to be detected.

The invention is based on the same view as my earlier U. S. Patent applications 685,193 and 667,446, now issued as Patents 2,495,634 and 2,530,611 respectively i. e. that the oscillations in the circuit of the variable impedance of a frequency-modulated generator exhibit an amplitude modulation which is proportional to the frequency sweep of the oscillations produced. Whereas in the transmitting system according to these earlier applications a negative feed-back voltage is derived from the said amplitude-modulated oscillations, it is in the present receiving circuit-arrangement the modulated signal which is derived with the aid of an amplitude detector from these oscillations. Since the frequency of the local oscillator is equal to that of the input oscillations, this modulated signal will be in exactly linear relation to the frequency sweep of the oscillations to be detected.

As is explained in the earlier U. S. application 685,193, Patent No. 2,495,634, the oscillations in the circuit of the variable reactance 5 exhibit an amplitude modulation exactly proportional to the frequency-sweep of the oscillations produced by the local oscillator 2, only if the reactance 5 does not exhibit losses. In order to obviate the fault if this condition is not satisfied, it is possible to proceed as set out in the above-mentioned earlier application. The losses may, for example, be represented by a loss resistance 13 located in parallel (Fig. 1). The current flowing through this resistance 13 may be compensated by the current traversing a compensating resistance 14, the value of which is substantially equal to the value of the mean loss resistance 13 of the inductance 5.

In the circuit-arrangement shown in Fig. 2 a similar step may be taken. This circuit-arrangement further indicates a simple solution in case the difficulty arises that the mean amplitude of the voltage across the variable inductance 5 is comparatively large with respect to the modulation of this voltage, i. e. that the modulation depth of this voltage is small. For this purpose the anode circuit of the oscillator tube is provided with an inductance 15, across which a compensating voltage is set up, so that the depth of modulation of the voltage across the inductance 5 may be arbitrarily increased.

In the foregoing it has always been assumed that the amplitude of the oscillations produced by the local oscillator was constant. Since the frequency of these oscillations must be variable over a comparatively large range, this is, however, not always the case. In order to avoid undesirable amplitude modulation of the voltage to be supplied to the detector 10, the variable reactance 5 may have connected to it, in accordance with the earlier U. S. application 667,446, Patent No. 2,530,611 either in series (Fig. 1) or in parallel (Fig. 2) a source of voltage (not shown), which produces an alternating voltage of constant amplitude and of a frequency which is different from the frequencies produced by the local oscillator, whilst before the detector 10 a filter (not shown) is provided which does not allow the last-mentioned frequencies to pass.

Figs. 3 and 4 show circuit-arrangements in which for the variable reactance, use is made of a reactance tube 5, the grid of which is connected to the anode of the oscillator tube 2 through a 90° phase-rotating network 16. Furthermore the reference numerals are the same as those of the preceding figures. The currents flowing through the internal resistance 20 and the internal tube capacity 21 of the reactance tube may again be compensated in a similar manner as the currents passing through the loss resistance 13 in the variable inductance described with reference to the preceding figures. For this purpose, according to Fig. 3, the anode of the reactance tube is connected through the primary winding of the transformer 9, a second secondary winding 18 of this transformer and a frequency-dependent network 17 consisting of a neutrodyne capacity 31 and a resistance 32, to a point of constant potential.

In the circuit-arrangement shown in Fig. 4 the influence of the internal tube resistance and capacity is neutralized by using a separating tube 19, so that the voltage set up in the resonant circuit 6 is not directly operative in the anode circuit of the reactance tube 5.

If the anode voltage of the reactance tube 5 is made operative in the control-grid circuit or in a second control-grid circuit of the oscillator tube 2, the separating tube 19 may be dispensed with.

The invention may also be applied to a circuit-arrangement in which across a resonant circuit comprising a variable impedance 5 is set up a voltage the amplitude of which controls the value of this variable impedance in such manner that the natural frequency of the circuit is in linear relation to the instantaneous frequency of the oscillations to be detected and, more particularly, is substantially equal to this frequency.

Figs. 5 and 6 show wiring diagrams relating to circuit-arrangements of this kind, the reference numerals being the same as in the preceding figures.

In general, in such a circuit-arrangement the amplitude modulation of the input oscillations must be obviated with the aid of a limiter.

In the circuit-arrangements shown the variable impedance is always represented by a variable reactance. As a matter of course the basic idea of the invention may be applied not only to inductances the permeability of the magnet core of which is varied, to condensers having a crystalline dielectric the capacity value of which is varied, or to reactance tubes, but also to those circuit-arrangements in which the value of an arbitrary impedance included in a resonant circuit is controlled in such manner that this circuit remains in resonance with the frequency of the input oscillations.

The basic idea of the invention is, of course, also applicable if the resonance frequency of the resonant circuit differs by a constant or a proportional amount respectively from the instantaneous frequency value of the input oscillations. This may occur if, for example, in the circuit-arrangement shown in Fig. 1, the output oscillations of the local oscillator 2, prior to their being supplied to the detector 3, are mixed with oscillations coming from a second local oscillator, but also if, for example, in the circuit-arrangement shown in Fig. 6 the inductances 21 and 7 are combined.

This case also occurs if, for example in the circuit-arrangements shown in Figs. 1 and 2 a higher harmonic of the oscillations produced by the local oscillator, the frequency of this harmonic being constantly equal to that of the input oscillations, is supplied to the detector 3.

What I claim is:

1. A detection circuit for a first wave having frequency deviations proportional to the amplitude variations of a modulating signal, comprising a local oscillator for generating a second wave having a frequency substantially linearly related to the frequency of said first wave, said local oscillator comprising a frequency determining resonant circuit including a variable reactance element, means coupled to said variable reactance element and responsive to phase differences between said first and second waves to vary the reactance of said variable reactance element to thereby vary the resonant frequency of said resonant circuit proportional to frequency deviations of said first wave, and means coupled to said reactance element to detect variations in the amplitude of the current flowing through said element to produce an output wave having amplitude variations proportional to the variations of said modulating signal.

2. A detection circuit for a first wave having frequency deviations proportional to the amplitude variations of a modulating signal, comprising a local oscillator for generating a second wave having a frequency substantially equal to the frequency of said first wave, said local oscillator having a frequency determining resonant circuit comprising a variable reactance element, means coupled to said variable reactance element and responsive to phase differences between said first and second waves to vary the reactance of said variable reactance element to thereby vary the resonant frequency of said resonant circuit proportional to frequency deviations of said first wave and means coupled to said reactance element to detect variations in the amplitude of the current flowing through said element to produce an output wave having amplitude variations proportional to the variations of said modulating signal.

3. A detection circuit for a first wave having frequency deviations proportional to the amplitude variations of a modulating signal, comprising a local oscillator for generating a second wave having a frequency substantially equal to the frequency of said first wave, said local oscillator having a frequency determining resonant circuit comprising a variable inductive element, means coupled to said variable inductive element and responsive to phase differences between said first and second waves to vary the reactance of said variable inductive element to thereby vary the resonant frequency of said resonant circuit proportional to frequency deviations of said first wave and means coupled to said inductive element to detect variations in the amplitude of the current flowing through said element to produce an output wave having amplitude variations proportional to the variations of said modulating signal.

4. A detection circuit for a first wave having frequency deviations proportional to the amplitude variations of a modulating signal, comprising a local oscillator for generating a second wave having a frequency substantially equal to the frequency of said first wave, said local oscillator having a frequency determining resonant circuit, a reactance tube device coupled to said resonant circuit, means coupled to said reactance tube device and responsive to phase differences between said first and second waves to vary the reactance of said reactance tube device to thereby vary the resonant frequency of said resonant circuit proportional to frequency deviations of said first wave and means coupled to said reactance tube device to detect variations in the amplitude of the current flowing through said device to produce an output wave having amplitude variations proportional to the variations of said modulating signal.

GERARD HEPP.

REFERENCES CITED

The following references are of record in the file of this patent:

UNITED STATES PATENTS

| Number | Name | Date |
| --- | --- | --- |
| 2,263,615 | Crosby | Nov. 25, 1941 |
| 2,280,525 | Hunt | Apr. 21, 1942 |
| 2,332,540 | Travis | Oct. 26, 1943 |
| 2,408,192 | Bell et al. | Sept. 24, 1946 |
| 2,440,653 | Corrington | Apr. 27, 1948 |